United States Patent Office 3,442,842
Patented May 6, 1969

3,442,842
PROCESS FOR THE PREPARATION OF
WATER-IN-OIL EMULSIONS
Wulf von Bonin, Leverkusen, Germany, assignor to Farbenfabriken Bayer Aktiengesellschaft, Leverkusen, Germany, a corporation of Germany
No Drawing. Filed Apr. 20, 1965, Ser. No. 449,631
Claims priority, application Germany, May 30, 1964,
F 43,029
Int. Cl. C10m 3/22; C08g 17/003
U.S. Cl. 260—29.2        4 Claims

ABSTRACT OF THE DISCLOSURE

Water-in-oil emulsions wherein the continuous organic phase includes, as emulsifying agent, a modified polyester having a molecular weight between 1,000 and 20,000, said modified polyester being a water insoluble polyester having a molecular weight between 500 and 10,000 of a diol and a carboxylic acid, reacted, through its terminal carboxyl and hydroxyl groups, with a water soluble polyethylene oxide reaction product having a molecular weight between 400 and 10,000.

---

The invention relates to the preparation of water-in-oil emulsions the oil phases of which may contain polyesters and/or polymerisable monomers and/or inert organic solvents, special emulsifying agents soluble in the oil phase being used for the preparation of these reverse emulsions.

The possibility of incorporating water in solutions of unsaturated polyesters in solvents not miscible with water to form reverse emulsions has already been disclosed in German Auslegeschrift 1,150,524. This process works without the use of emulsifying agents soluble in the oil phase. However, it has been found that without the use of such auxiliary agents, it is only possible to produce reverse emulsions of relatively low water contents of about 50 to 200% calculated on the oil phase of the reverse emulsion.

It has further been proposed to employ graft polymers of vinyl esters, aromatic vinyl compounds or acrylates or methacrylates on polyalkylene oxides as emulsifying agents for the preparation of reverse emulsions of polyesters or solutions of polyesters in solvents that are not miscible with water. Even if these graft polymers are effective reverse emulsifiers, they generally have the property of not dissolving in polyesters, especially if the polyesters are unsaturated. They can therefore only be employed in relatively dilute solutions of these polyesters in a solvent for the polymer.

It has been found that for the preparation of water-in-oil emulsions the oil phases of which may contain saturated and/or olefinically unsaturated organic polyesters and/or polymerisable monomers containing at least one terminal $CH_2=C<$ group and/or inert solvents, it is especially advantageous to use as emulsifying agent, derivatives of polyesters of polyhydric, especially dihydric alcohols and polybasic, especially dibasic carboxylic acids, which derivatives contain polyalkylene oxide radicals linked through their terminal hydroxyl and/or carboxyl groups.

The said polyester derivatives are derived from polyesters of molecular weight 500 to 10,000, preferably 1000 to 5500, and the polyalkylene oxide radicals have a molecular weight of 400 to 10,000, preferably 1000 to 4000.

The said polyester derivatives, which are used as emulsifying agent have a molecular weight between 1000 and 20,000. They are insoluble or sparingly soluble in water.

As to the term "sparingly soluble or insoluble" this term is meant to relate to such polyesters which are soluble in water at 25° C. up to an amount of 10 grams per 100 grams of water.

The polyalkylene oxide radicals are linked to the hydroxyl and/or carboxyl groups of the polyesters either directly but preferably indirectly through polyfunctional connecting members.

Suitable polymerizable monomers containing at least one terminal $CH_2=C<$ group, more especially monovinyl aromatic compounds such as styrene or its derivatives and substituted products such as styrenes alkylated in the nucleus or side chains, halogenation products and others, and also aliphatic vinyl compounds, for example vinyl esters such as vinyl acetate, propionate and butyrate; esters of acrylic and/or methacrylic acids such as methylacrylate, methyl methacrylate, ethyl methacrylate, cyclohexyl methacrylate and the like, vinyl halides such as vinylchloride or vinylidene chloride, and also monoolefines and/or polyolefines, more especially aliphatically conjugated diolefines, such as isoprene, 2,3-dimethyl butadiene, chloroprene as well as acrylonitrile and mixtures thereof.

As to the term "inert solvents" this term is meant to relate to such organic solvents, which show at normal conditions no reaction with polyesters, polymerizable monomers, compounds with methylol groups, isocyanates, compounds with epoxy groups and which do not adversely effect the reaction of the polymerization. Suitable inert solvents are for example liquid esters of aliphatic carboxylic acids having 1–6 carbon atoms with monohydric alcohols having 1–6 carbon atoms, aromatic hydrocarbons such as benzene, toluene, xylene, aliphatic ethers such as glycol dimethyl ether, glycol monomethyl ether acetate, halogenated aliphatic hydrocarbons such as chloroform, carbon tetrachloride per- or trichloroethylene.

The said polyesters are obtainable in known manner by polycondensation of polybasic carboxylic acids and compounds having several hydroxyl groups. Examples of suitable polybasic carboxylic acids are especially aromatic, cycloaliphatic, saturated and unsaturated aliphatic carboxylic acids such as phthalic acids, isophthalic acid, terephthalic acid, tetrahydrophthalic acid, hexahydrophthalic acids, succinic acid, glutaric acid, adipic acid and homologues, maleic acid, fumaric acid and HET acid (Hexachloro - endomethylene - tetrahydrophthalic acid). As compounds having several hydroxyl groups it is preferred to use dihydric aliphatic, cycloaliphatic or araliphatic alcohols such as mono-, di- or triethylene glycol or 1.2- and/or 1.3-propylene glycol, 1.3- and/or 1.4-butanediol, 1.6-hexanediol, 1.4-butenediol, 1.4-butinediol, cyclohexanediols, bis-oxyethyl-ester of terephthalic acid and partially etherified or esterified polyhydric alcohols such as monoallylglyceric ether, monoallylether of trimethylalpropane, monoesters of glycerol with fatty acids containing 8 to 20 carbon atoms (for example ricinoleic acid, linolenic acid, linoleic acid, stearic acid and oleic acid). It is also possible to employ phenols such as hydroquinone, resorcin or 4.4'-dihydroxydiphenylmethane, 4:4'-dihydroxyphenylmethylmethane, 4.4'-dihydroxydiphenylsulfone and dihydroxyethyl derivatives of these compounds as diol components.

The polyesters used as starting components for the preparation of the emulsifying agents should be insoluble in water, have no significant surface active properties and be soluble in monomeric liquid vinyl compounds, especially styrene. The last-mentioned property is important especially if unsaturated polyesters together with monomeric vinyl compounds, which are subsequently to be polymerised together, are employed in the oil phase of the reverse emulsions.

The polyalkylene oxides employed for the preparation of the compounds which have a emulsifying effect to form a water-in-oil emulsion should have molecular weights of 400 to 10,000, preferably 1000 to 4000, and be soluble in water. Polyethylene oxides, which may if desired be partially further reacted, e.g. etherified or esterified polyethylene oxides are therefore preferably employed, provided their polyalkylene oxide chain has the required molecular weight and the products are water-soluble. However, polyalkylene oxide copolymers are also suitable provided they meet the above-mentioned conditions, e.g. propylene oxide-ethylene oxide copolymers having a propylene oxide content below 50 mols percent.

The direct introduction of the polyalkylene oxide radicals into the polyester can be carried out in known manner by addition of alkylene oxides to the OH or COOH groups of the polyester by acid or preferably basic catalysis. To effect this, the polyesters are reacted for example in the presence of pyridine or as alkali metal salt or alcoholate with the alkylene oxides, if desired under pressure.

It is preferred, however, to link the polyalkylene oxide radical to the polyester molecule through a connecting member which is at least bifunctional. The connecting member should be of such a structure that it can react both with the end groups of the polyester and with the end groups of the polyalkylene oxide. Compounds which are suitable for use as such connecting members which are at least bifunctional are compounds which contain several methylol groups, methylol groups etherified with lower alcohols, isocyanate groups or epoxy groups.

Suitable compounds having several methylol or etherified methylol groups are phenol formaldehyde condensation products having at least 2 methylol groups in soluble in organic solvents, or products of etherification of these condensation products, with methyl-, ethyl-, propyl- and butyl alcohol, and aminoplasts having at least 2 methylol groups soluble in organic solvents, e.g. formaldehyde condensation products of urea, thiourea, ethylene- or propylene urea and of aminotriazines such as melamine and of guananidine and their ethers with alcohols such as methyl-, ethyl-, propyl- and butyl alcohol.

Especially suitable compounds having several isocyanate groups are aliphatic, aromatic or araliphatic diisocyanates such as hexamethylene diisocyanate, 2.4- and 2.6-toluylene diisocyanate and mixtures thereof naphthalene - 1.5 - diisocyanate, 4:4'-diphenylmethane diisocyanate, triphenylmethane-4.4'.4''-triisocyanate. As examples of suitable compounds having several epoxy groups may be mentioned the glycidic ethers, especially diglycidic ethers of aliphatic or cycloaliphatic polyhydric alcohols such as diglycidic ether of ethylene glycol, 1.4-butylene glycol, triglycidic ether of glycerin, trimethylol propane but more especially of polyhydric phenols such as 4.4'-dihydroxy-diphenyldimethylmethane, 4.4' - dihydroxy-diphenyl sulfone, hydroquinone, resorcin.

The preparation of the emulsifiers employed according to the invention may be carried out by mixing the above mentioned components, if desired in the presence of a solvent inert to isocyanates, epoxides or methylol compounds, at room temperature and then bringing them to reaction with each other at 30 to 130° C., a homogeneous product being formed. Suitable inert solvents are esters of aliphatic carboxylic acids with monohydric alcohols such as ethyl acetate, aromatic hydrocarbons such as benzene, aliphatic ethers such as glycol dimethyl ether, halogenated aliphatic hydrocarbons such as chloroform. The reaction should generally be carried out in such a manner that there is no appreciable rise in viscosity of the reaction mixture during the reaction, i.e. there should on the whole be no polyaddition or polycondensation during the reaction but ideally the molecules of the reactants should only react singly with each other. Reaction products should thus preferably have the following structure: Polyester molecule (PE)-connecting member (B)-polyalkylene oxide molecule (PA). However, when the three components are reacted together it is impossible to prevent the formation of other types of molecules such as PE–B–PA–B–PE or PA–B–PE–B–PA or PE–B–PE–B–PA. To keep the molecular weights of the resulting reaction products as low as possible, it has been found advantageous to employ the polyester components in molar excess over the two other components. The above-mentioned components are preferably employed in the following proportions: 2–11 mols of polyester, 1 mol of polyalkylene oxide, 0.5 to 2.5 mols of the compounds having several isocyanate, epoxy or methylol groups. Although products having an inverse emulsifying effect are also obtained if proportions other than those mentioned are employed, this emulsifying effect will then usually only be manifested to a small extent or the products will be highly viscous to solid and in part will be only sparingly soluble substances and difficult to handle.

To prepare the reverse emulsions with the aid of the emulsifying agents employed according to the process, these emulsifying agents are dissolved in quantities of 1 to 100% by weight in the oil phase which is to be emulsified; thus in the extreme case, the emulsifying agent itself functions as oil phase.

Normally, however, the oil phase consists of a polyester of any molecular weight, which is liquid at room temperature, or of solutions of polyester in inert solvents that are sparingly soluble or insoluble in water or of mixtures of polyesters and polymerizable monomers containing at least one terminal $CH_2=C<$ groups, or of polyesters, said polymerizable monomers and solvents, or of solvents. Preferably, the oil phase consists of a saturated or unsaturated organic polyester and polymerisable monomers such as styrene, methylmethacrylate. As to the term "sparingly soluble or insoluble in water," this term is meant to relate to such solvents, which are soluble in water at 25° C. up to an amount of 10 grams per 100 grams of water.

The polyesters contained in the oil phase have to meet the same requirements as the polyesters which serve as starting materials for the preparation of the emulsifying agents. The above remarks also apply to their possible composition. There are in principle no limitations on the polyester content of the oil phase and it may vary between 0 and 100% minus the emulsifying agent although it is to be regarded as an advantage of the process of the invention that the polyester content of the oil phase may be above 30% without any incompatibility with the emulsifying agent being observed. If the oil phase is to be subjected to a radical polymerisation and accordingly contains compounds capable of radical polymerisation, polymerisation activators may be added to it. These activators may be the usual peroxidic, nitrogen-containing or metal compounds. They have been fully described in German Auslegeschriften 1,148,382 and 1,160,616.

To prepare the reverse emulsion, the aqueous phase is stirred into the oil phase which contains the emulsifying agent according to the invention. To obtain a reverse emulsion, the aqueous phase has to be introduced carefully, if possible portionwise, because it has been found that in the case of more highly viscous oil phases, mechanical difficulties are encountered in incorporating the aqueous phase owing to the fact that with increasing viscosity of the reverse emulsion, the aqueous phase is taken up more and more slowly. A too great excess of aqueous phase which is not yet emulsified into the system may increase the shearing forces within the stirred mass to such an extent that separation of the system to be emulsified into the aqueous phase and the phase of reverse emulsion having a lower water content takes place, which is not desirable.

The aqueous phase may consist of pure water or aqueous solutions or suspensions. It may contain up to 60% by weight of organic water-soluble compounds such as methanol, glycol, glycerol, triethanolamine or salts such as sodium acetate, CaCl$_2$, ammonium borate, sodium silicate, lead acetate or potassium persulphate or ammonium persulphate; large additions of phosphoric acid or silicic acid may also be contained in the aqueous phase. The said additions to the aqueous phase will naturally as a rule be employed in small quantities, for example if they are polymerisation activators. Moreover, the extent to which the additions to the aqueous phase influence the stability of the reverse emulsions differs for different oil phases so that in any particular case it is necessary to determine which additives and which quantities of these additives will not prevent the formation of a reverse emulsion.

The reverse emulsions may contain 10 to 1500, preferably 50 to 500 volumes percent of aqueous phase (based on the oil phase). The additional incorporation of solids is also possible, especially in the case of polymerisable emulsions before the polymerisation process. Particularly suitable solid materials are fibers or fabrics of an inorganic nature.

Special effects can be achieved by the addition of soluble or pigment dyestuffs to the aqueous or oil phase of the reverse emulsions.

The reverse emulsions can be employed as lubricants, as hydraulic liquids or, if they contain compounds capable of radical polymerisation, for the production of polymers from the reverse emulsions.

The following polyesters are used to illustrate the different properties of the different types of polyesters which can be used as starting materials for the preparation of the emulsifying agents in the examples given:

| Polyester | Molecular weight | Percent OH | Percent COOH | Composition in mol percent |
|---|---|---|---|---|
| A | 2,000 | 1.7 | <0.2 | ~49.5 adipic acid; ~50.5 diethylene glycol. |
| B | 1,000 | 3.3 | <0.4 | ~49 adipic acid; ~51 diethylene glycol. |
| C | 2,200 | <0.2 | 4.1 | Polyester A, end groups reacted with maleic acid anhydride. |
| D | 2,100 | ~1.5 | ~2 | Polyester A, half the end groups reacted with maleic acid anhydride. |
| E | 5,000 | ~0.3 | ~0.9 | 50 adipic acid, 35 propylene glycol, 15 butanediol. |
| F | 4,000 | 0.9 | <0.3 | 24 adipic acid, 25 maleic acid, 25 1.4-butanediol, 26 glycol monoricinoleate. |
| G | 5,000 | ~0.5 | ~0.7 | 25 terephthalic acid, 25 adipic acid, 25 hexanediol, 25 1:2-propylene glycol. |
| H | 4,500 | 0.8 | <0.2 | 25 maleic acid, 25 phthalic acid, 25 1-3-butylene glycol, 25 1:2-propylene glycol. |
| J | 5,000 | ~0.3 | ~0.9 | 23 phthalic acid, 27 fumaric acid, 50 1:3-butylene glycol. |
| K | 3,000 | ~1.2 | <0.3 | 28 tetrachlorophthalic acid, 21 maleic acid, 25 ethylene glycol, 26 1:3-butylene glycol. |

The polyesters prepared with the use of maleic acid or maleic acid anhydride have undergone partial molecular rearrangement into fumaric acid types.

The conditions for the preparation of the emulsifying agents according to the invention for various combinations given by way of example are summarised in the following table:

| | Example No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| | Parts | | | | | | | | | | | | | |
| Polyester A | 900 | 900 | 900 | 900 | 900 | | | | | | | | | |
| Polyester B | | | | | | 1,000 | | | | | | | | |
| Polyester C | | | | | | | 800 | 800 | | | | | | |
| Polyester D | | | | | | | | | 1,000 | | | | | |
| Polyester E | | | | | | | | | | 2,000 | | | | |
| Polyester F | | | | | | | | | | | 2,000 | | | |
| Polyester G | | | | | | | | | | | | 2,000 | | |
| Polyester H | | | | | | | | | | | | | 1,800 | |
| Polyester J | | | | | | | | | | | | | 300 | |
| Polyester K | | | | | | | | | | | | | | 1,200 |
| Hexamethylene diisocyanate | 15 | 25 | 44.5 | 45 | 20 | 35 | | | | | 40 | 25 | | |
| Commercial toluylene diisocyanate (isomeric mixture) | | | | | | | 15 | 40 | 45 | 45 | | 20 | 40 | 30 |
| Polyethylene oxide mol wt. 750 | | | | | | 150 | | | | | | | | |
| Polyethylene oxide mol wt. 1,500 | 45 | 90 | 190 | 220 | | | 150 | 160 | | 160 | 150 | 200 | 140 | 150 |
| Polyethylene oxide mol wt. 4,000 | | | | | 100 | | | | | | | | | |
| Ethoxylated oleyl alcohol M 2,400 | | | | | | | | | 180 | | | | | |
| Toluene | | | | | | | | | | | | 2,000 | | |
| Styrene | | | | | | | | | | | 1,400 | | 1,800 | 800 |
| Ethyl acetate | | | | | | | | | 1,000 | | | | | |
| Reaction temperature, °C | 60 | 50 | 50 | 45 | 60 | 80 | 50 | 50 | 70 | 70 | 55 | 60 | 40 | 45 |
| Reaction time, h | 10 | 22 | 18 | 30 | 15 | 6 | 18 | 25 | 10 | 15 | 10 | 20 | 18 | 10 |

To carry out the reaction, the polyalkylene oxide is dissolved or suspended in the polyester or polyester solution and heated. The isocyanate is then added and the mixture stirred for several hours at elevated temperature. Soluble, viscous to wax-like products compatible with polyesters of type A–K are obtained in every case.

The reverse emulsifying effect of the products of the process are illustrated in the following tabulated examples:

| | Example | | | | | | | | | | | | | | | | | |
|---|---|---|---|---|---|---|---|---|---|---|---|---|---|---|---|---|---|---|
| | 15 | 16 | 17 | 18 | 19 | 20 | 21 | 22 | 23 | 24 | 25 | 26 | 27 | 28 | 29 | 30 | 31 | 32 |
| | Parts | | | | | | | | | | | | | | | | | |
| Emulsifier according to Example 1 | 10 | | | | | | | | | | | | | | | | | |
| Emulsifier according to Example 2 | | 9 | | | | | | | | | | | | | | | | |
| Emulsifier according to Example 3 | | | 10 | 5 | 2 | | | | | | | | | | | | | |
| Emulsifier according to Example 4 | | | | | | 9 | | | | | | | | | | | | |
| Emulsifier according to Example 5 | | | | | | | 7 | | | | | | | | | | | |
| Emulsifier according to Example 6 | | | | | | | | 16 | 30 | | | | | | | | | |
| Emulsifier according to Example 7 | | | | | | | | | | 12 | | | | | | | | |
| Emulsifier according to Example 8 | | | | | | | | | | | 100 | 10 | 50 | 15 | | | | 20 |
| Emulsifier according to Example 11 | | | | | | | | | | | | | | | 10 | | | |
| Emulsifier according to Example 14 | | | | | | | | | | | | | | | | 20 | 20 | |
| Polyester A | | | | | | | | | | | | | | | | | | 50 |
| Polyester F | | | | | | | | | 80 | 70 | | | | | | 70 | | |
| Polyester H | 40 | | | | 40 | 65 | | | | | | 60 | | | | | | |
| Polyester H | | 30 | | | | | | | | | 60 | | | | 50 | 10 | | |
| Polyester K | | | | | | | | 60 | | | | | | | | | 60 | |
| Xylene | | | | | | | | | | | | | | | 80 | | | |
| Styrene | 60 | 70 | 100 | 60 | 35 | 40 | | | | | 401 | | 40 | 90 | 30 | | 40 | |
| Methylmethacrylate | | | | | | | | | 30 | | | | 50 | | | | | |
| Perchloroethylene | | | | | | | 20 | | | | | | | | | | | |
| Ethyl acetate | | | | | | | | | | | | | | | | | | 50 |
| Water incorporated in the emulsion | 250 | 400 | 1,000 | 500 | 200 | 450 | 500 | 50 | 100 | 400 | 250 | 700 | 600 | 1,300 | 900 | 400 | 400 | 550 |

To prepare the emulsion, the emulsifying agent is first dissolved in the polyester or the polyester solution, and the water is then stirred into the oil phase, the precautionary measures explained in the preceding text being observed. The process can, of course, also be applied to other types of polyesters provided they conform to the conditions mentioned. For example, experiment 26 can also be carried out with the types of polyester B, C, D, E and G. Stable, creamy reverse emulsions are obtained in each case. This can be confirmed by demonstrating that a drop of the emulsion will not be distributed in water but behaves like an oil drop, i.e. it will not take up water.

The possibility of polymerising suitable reverse emulsions prepared with the aid of the emulsifying agents according to the process is illustrated by the following examples:

EXAMPLE 33

350 parts of $H_2O$ are incorporated by emulsification into a solution consisting of 50 parts of polyester J. 60 parts of styrene, 10 parts of emulsifier according to Example 3 and 2.5 parts of benzoyl peroxide. 1.5 parts of N-dimethyl-p-toluidine are then stirred into the stable, creamy reverse emulsion. The emulsion is then poured into a dish where it hardens overnight at room temperature.

EXAMPLE 34

500 parts of water are carefully emulsified into a solution consisting of 40 parts of polyester J. 70 parts of methyl methacrylate, 8 parts of emulsifier according to Example 8 and 2 parts of azo diisobutyronitrile. The creamy, stable reverse emulsion can be hardened at 65° C. to a solid, water-containing polymer mass.

EXAMPLE 35

A solution of 2 parts of ammonium peroxydisulphate in 100 parts of $H_2O$ followed by a solution of 1 part of sodium disulphite in 100 parts of $H_2O$ are emulsified into a solution consisting of 55 parts of polyester H, 45 parts of styrene and 10 parts of emulsifier according to Example 8. The stable reverse emulsion obtained hardens overnight at 45° C.

EXAMPLE 36

10 parts of an addition product of 20 mols of ethylene oxide and polyester A are dissolved, together with 90 parts of polyester H, in 70 parts of styrene. 10 to 300 parts of $H_2O$, according to requirement, can be stirred into this solution to form a stable, creamy reverse emulsion. If 1.5 parts of lauroyl peroxide are added to the organic phase prior to the emulsifying process, the reverse emulsion can be hardened to solid blocks of polymer at 50 to 75° C.

EXAMPLE 37

100 parts of polyester A and 10 parts of hexamethylol melamine butyl ether (Maprenal NP®) and 20 parts of polyethylene oxide of molecular weight 1500 are stirred for 10 hours at 130° C. 10 parts of the resulting product are then dissolved in 100 parts of styrene. 1600 parts of water can be stirred into this solution to form a stable reverse emulsion. If 10 parts of the resulting product and 50 parts of polyester H are dissolved in 50 parts of styrene, 100 to 680 parts of $H_2O$ can be stirred in to form a stable reverse emulsion.

EXAMPLE 38

Procedure analogous to Example 37 except that polyester C is used instead of polyester A for the preparation of the emulsifier.

EXAMPLE 39

Procedure analogous to Example 37 except that instead of hexamethylolmelamine butyl ether, the same quantity of a formaldehyde precondensate based on propylene urea is used for linking the polyester molecule and polyalkylene oxide.

EXAMPLE 40

100 parts of polyester A are stirred together with 20 parts of polyethylene oxide (molecular weight 1550) and 10 parts of 4:4'-dihydroxydiphenyl-dimethylmethane-diglycidic ether for 12 hours at 130° C. A viscous mass is obtained which is readily soluble in aromatic compounds, esters and polyesters. 10 parts of the reaction product are dissolved in 100 parts of styrene. It is then possible to stir 1700 parts of water into this solution to form a reverse emulsion. If 10 parts of the reaction product together with 50 parts of polyester H are dissolved in 50 parts of styrene, 5 to 400 parts of water can be stirred into this solution to form a stable reverse emulsion.

EXAMPLE 41

Procedure analogous to Example 40 except that polyester C is used instead of polyester A.

EXAMPLE 42

Procedure analogous to Example 40 except that polyester B is used instead of polyester A.

What I claim is:
1. A water-in-oil emulsion having water finely dispersed within a liquid organic phase, said organic phase comprising a water insoluble emulsifying agent of a molecular weight between 1,000 and 20,000 and being the reaction product of (a) a water insoluble polyester of a diol and a dicarboxylic acid having a molecular weight of between 500 and 10,000, (b) a water soluble polyethylene oxide reaction product having a molecular weight between 400 and 10,000 and (c) a compound containing at least two functional groups selected from the group consisting of methylol, lower alcohol etherified methylol, isocyanate and epoxy groups, said functional groups of (c) serving to link the polyester of (a) and the polyethylene oxide of (b) together.

2. The water-in-oil emulsion of claim 1 wherein said organic phase includes at least one member selected from the group consisting of a saturated or olefinically unsaturated organic polyester, a polymerizable monomer having at least one terminal $CH_2=CH<$ group and an inert organic solvent.

3. The water-in-oil emulsion of claim 1 wherein said diol is selected from the group consisting of ethylene glycol, diethylene glycol, 1,2-propylene glycol, 1,3-butanediol, 1,4-butanediol, 1,6-hexanediol and mixtures thereof and wherein said dicarboxylic acid is selected from the group consisting of maleic acid, fumaric acid, adipic acid, phthalic acid, terephthalic acid, tetrachlorophthalic acid and mixtures thereof.

4. The water-in-oil emulsion of claim 1 wherein said compound having at least two functional groups is selected from the group consisting of hexamethylene-1,6-diisocyanate, 2,4-toluylene diisocyanate, 2,6-toluylene diisocyanate, mixtures of said toluylene diisocyanates, hexamethylol melamine butyl ether and 4,4'-dihydroxydiphenyl-dimethylmethane-diglycidic ether.

References Cited

UNITED STATES PATENTS

| | | | |
|---|---|---|---|
| 2,855,373 | 10/1958 | Guenther. | |
| 3,256,219 | 6/1966 | Will. | |
| 3,310,512 | 3/1967 | Curtile | 260—29.2 |
| 2,091,106 | 8/1937 | Piggott | 252—356 |
| 2,443,735 | 6/1948 | Kropa | 260—29.2 |
| 2,552,706 | 5/1951 | Bertram | 252—356 |
| 2,634,245 | 4/1953 | Arndt | 260—29.2 |
| 2,689,219 | 9/1954 | Menaul | 252—309 |

(Other references on following page)

FOREIGN PATENTS 664,624  6/1963  Canada.

OTHER REFERENCES

Surface Active Agents and Detergents, vol. II, Schwartz et al., 1958, Interscience Pub., New York, T.P. 149-53, pp. 478-480.

MURRAY TILLMAN, *Primary Examiner.*

JOHN C. BLEUTGE, *Assistant Examiner.*

U.S. Cl. X.R.

252—309, 356; 260—29.4, 29.6, 75, 835, 850, 858, 860, 861, 870, 873